US008987638B2

(12) United States Patent
Hiroi et al.

(10) Patent No.: US 8,987,638 B2
(45) Date of Patent: Mar. 24, 2015

(54) ENGINE DRIVEN WELDING MACHINE

(75) Inventors: Toru Hiroi, Sakado (JP); Kentaro Kawabata, Sayama (JP)

(73) Assignee: Denyo Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 12/155,467

(22) Filed: Jun. 4, 2008

(65) Prior Publication Data
US 2008/0308541 A1 Dec. 18, 2008

Related U.S. Application Data

(63) Continuation-in-part of application No. 11/898,687, filed on Sep. 14, 2007.

(30) Foreign Application Priority Data

Jun. 15, 2007 (JP) .................................. 2007-159139
Feb. 27, 2008 (JP) .................................. 2008-045988

(51) Int. Cl.
*B23K 9/10* (2006.01)

(52) U.S. Cl.
CPC .................................. *B23K 9/1043* (2013.01)
USPC .................................................... 219/137 PS

(58) Field of Classification Search
USPC ............... 219/130.21, 130.32, 130.33, 130.4, 219/133, 134, 137 PS; 290/40 R; 322/11
See application file for complete search history.

(56) References Cited

U.S. PATENT DOCUMENTS

| 4,270,695 | A | * | 6/1981 | Carson | 237/12.1 |
|---|---|---|---|---|---|
| 5,977,646 | A | * | 11/1999 | Lenz et al. | 290/40 C |
| 6,040,555 | A | * | 3/2000 | Tiller et al. | 219/132 |
| 6,111,217 | A | * | 8/2000 | Beeson et al. | 219/133 |
| 6,166,525 | A | * | 12/2000 | Crook | 322/11 |
| 2002/0190044 | A1 | * | 12/2002 | Leisner et al. | 219/133 |
| 2006/0157459 | A1 | * | 7/2006 | Fosbinder | 219/130.21 |

FOREIGN PATENT DOCUMENTS

| JP | 59-110163 | 7/1984 |
|---|---|---|
| JP | 04-162964 | 6/1992 |
| JP | H06-114555 | 4/1994 |

(Continued)

OTHER PUBLICATIONS

European Search Report dated Sep. 22, 2008.

(Continued)

*Primary Examiner* — Brian Jennison
(74) *Attorney, Agent, or Firm* — Jacobson Holman, PLLC.

(57) ABSTRACT

An engine driven welding machine in which a welding generator is driven by an engine, and the engine performs an idle operation when a welding operation is stopped by including an engine stop signal forming circuit which forms a stop signal for stopping an operation of the engine when time of the idle operation exceeds a predetermined time, a direct-current power supply connected to an output terminal of the welding machine, voltage detecting means which detects a voltage change of the output terminal, a restart detecting circuit which forms a restart signal for restarting the engine when the detected voltage by the voltage detecting means shows a predetermined change mode for starting the welding operation, and an engine control circuit which stops the engine in response to the stop signal, and restarts the engine in response to the restart signal.

4 Claims, 11 Drawing Sheets

(56) References Cited

FOREIGN PATENT DOCUMENTS

| | | |
|---|---|---|
| KR | 10-2003-0018826 | 10/2003 |
| TW | M306532 | 2/2007 |

OTHER PUBLICATIONS

TW Office Action mailed Nov. 5, 2013.
Korean Office Action of Nov. 19, 2013.

* cited by examiner

US 8,987,638 B2

ENGINE DRIVEN WELDING MACHINE

CROSS REFERENCE TO RELATED APPLICATIONS

This continuation in part application is based upon and claims the benefit of U.S. application Ser. No. 11/898,687, filed Sep. 14, 2007, the entire contents of which are incorporated herein by reference.

BACKGROUND OF THE INVENTION

1. Field of the Invention

The present invention relates to an engine driven welding machine, and particularly to a technique of reducing the amount of time that an engine wastefully runs at idle as much as possible and increasing reliability of restart of the engine.

2. Related Art

In an engine driven welding machine, in order to reduce fuel consumption and noise of an engine, the engine shifts to an idle operation from a standard operation every time a welding operation is stopped, and the engine is returned to the standard operation from the idle operation every time the operation is started. When the welding operation is stopped for a long time, an operator himself stops the engine.

However, the situation is different when a welding operation is performed at high elevations of a high-rise building and the like, and when the welding machine main body is placed on the ground and power is supplied by running a welding cable to an operation site. In such a case, when the welding operation is stopped for some long time, in order to stop the engine, the operator descends to the ground and performs a stop operation, and this is troublesome and not efficient.

Thus, there is proposed a method for performing a remote control by transmitting a remote control high frequency signal by superimposing it on a welding cable (see Japanese Patent Laid-Open No. 1992-162964). This forms an operation signal by a touch sensor in which a noise filter for signal extraction is incorporated or a similar welding holder, and can stop the engine by sending the operation signal to the welding machine main body by an operation of an operator.

However, there is the problem in the operation site in the respect that the touch sensor may be lost, and since the welding holder with the noise filter incorporated therein is not widely used, the problem is in unsolved.

SUMMARY OF THE INVENTION

The present invention is made in view of the above described point, and has an object to provide an engine driven welding machine which is favorable in operability, has high reliability and reliably performs idle stop and restart.

In order to attain the above-described object, the present invention provides an engine driven welding machine in which a welding generator is driven by an engine, and the aforesaid engine performs an idle operation when a welding operation is stopped, characterized by including an engine stop signal forming circuit which forms a stop signal for stopping an operation of the aforesaid engine when a time of the aforesaid idle operation exceeds a predetermined time, a direct-current power supply connected to an output terminal of the aforesaid welding machine, voltage detecting means which detects a voltage change of the aforesaid output terminal, a restart detecting circuit which forms a restart signal for restarting the aforesaid engine when the detected voltage by the aforesaid voltage detecting means shows a predetermined change mode for starting the welding operation, and an engine control circuit which stops the aforesaid engine in response to the aforesaid stop signal, and restarts the aforesaid engine in response to the aforesaid restart signal.

As described above, in the present invention, the operation of the engine is stopped based on the engine stop signal, and the engine is restarted by surely detecting the voltage change showing the start of a welding operation. Therefore, stopping the engine when it is not required and restarting the engine when it is required can be reliably carried out in the present invention.

DETAILED DESCRIPTION OF THE INVENTION

Hereinafter, embodiments of the present invention will be described with reference to the attached drawings.

(Embodiment 1)

Figure 1:
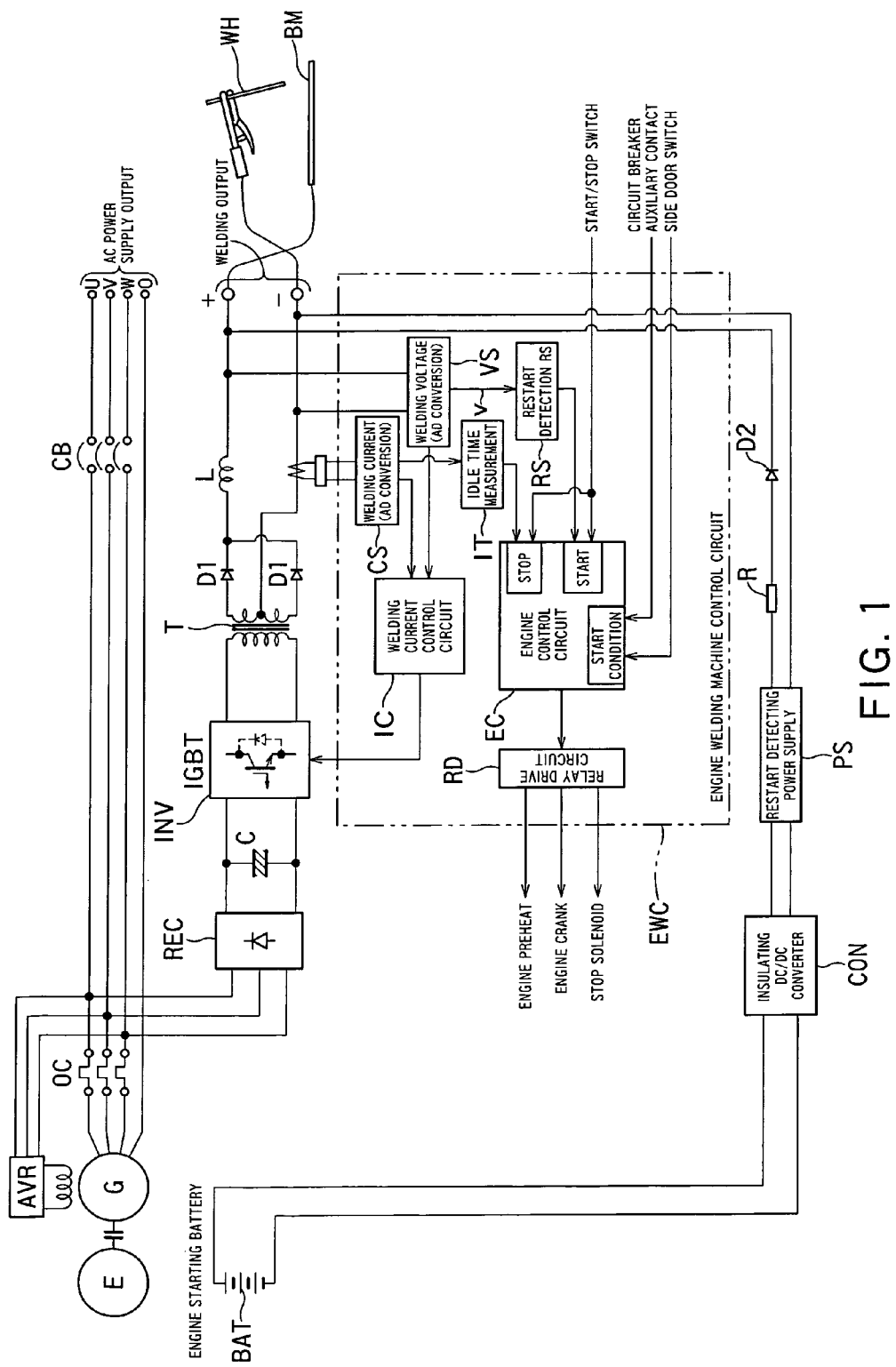
FIG. 1 is a circuit diagram showing a configuration of one embodiment of the present invention.

FIG. 1 is a block diagram showing a circuit configuration of an embodiment 1 of the present invention. The embodiment 1 is applied to a welding machine which supplies an alternating-current power supply output and welding output by driving a welding generator G by an engine E as shown in FIG. 1.

The welding generator G takes out the output controlled by an automatic voltage regulator AVR via an over current relay OC and divides it into two, and supplies one to output terminals U, V, W and O through a circuit breaker CB, and supplies the other one to output terminals + and − by subjecting it to DC-AC conversion and AC-DC conversion after a rectifying circuit REC and welding current control.

The rectified output of the rectifying circuit REC is given to an inverter INV through a capacitor C and subjected to AC conversion, then is given to the output terminals + and − as direct-current output via a high-frequency transformer T, rectifiers D1 and D1 and a direct-current reactor L, and is supplied to a welding holder WH and a base material BM.

The voltage and current given to the output terminals + and − are detected by a welding voltage detector VS and a welding current detector CS and used for controlling the inverter INV via a welding current control circuit IC, and are used for controlling the engine E via a restart detecting circuit RS, an idle time measuring circuit IT, an engine control circuit EC and a relay drive circuit RD.

Specifically, a detected voltage "v" of the welding voltage detector VS is given to the welding current control circuit IC on one hand, and is given to a start port of the engine control circuit EC via the restart detecting circuit RS on the other hand.

The detected current of the welding current detector CS is given to the welding current control circuit IC on one hand, and is given to a stop port of the engine control circuit EC via the idle time measuring circuit IT on the other hand.

The welding current control circuit IC controls the inverter INV based on the detected voltage of the welding voltage detector VS and the detected current of the welding current detector CS, and controls the welding current to be supplied to the output terminals + and −.

The restart detecting circuit RS has a function of detecting the welding start operation of an operator using a welding rod WH given via the welding voltage detector VS to form a detection signal for restarting the engine. The operation content is to always apply direct-current voltage between the output terminals + and −, take out the voltage change formed by the operator causing the welding rod WH to contact the base material BM to form the restart detection signal and give it to the engine control circuit EC, as will be described later by using FIG. 2.

As the direct-current power supply for restart detection which always applies direct-current voltage between the output terminals + and −, a battery BAT, an insulating DC/DC converter CON, a restart detecting power supply PS, a resistor R and a diode D2 are provided.

In order not to perform an unnecessary idle operation, the idle time measuring circuit IT gives a stop signal to the stop port of the engine control circuit EC to stop the engine E when the idle time becomes a predetermined length.

In addition to the signals from the idle time measuring circuit IT and the restart detecting circuit RS, signals from the starting/stopping switch are given to the start port or the stop port, and the engine control circuit EC operates engine preheat, an engine crank and a stopping solenoid of the engine E via the relay drive circuit RD. Further, on the occasion of performing this operation, the engine control circuit EC refers to each open/closed state of a circuit breaker auxiliary contact and a side door switch provided at a welding machine casing.

Figure 2:
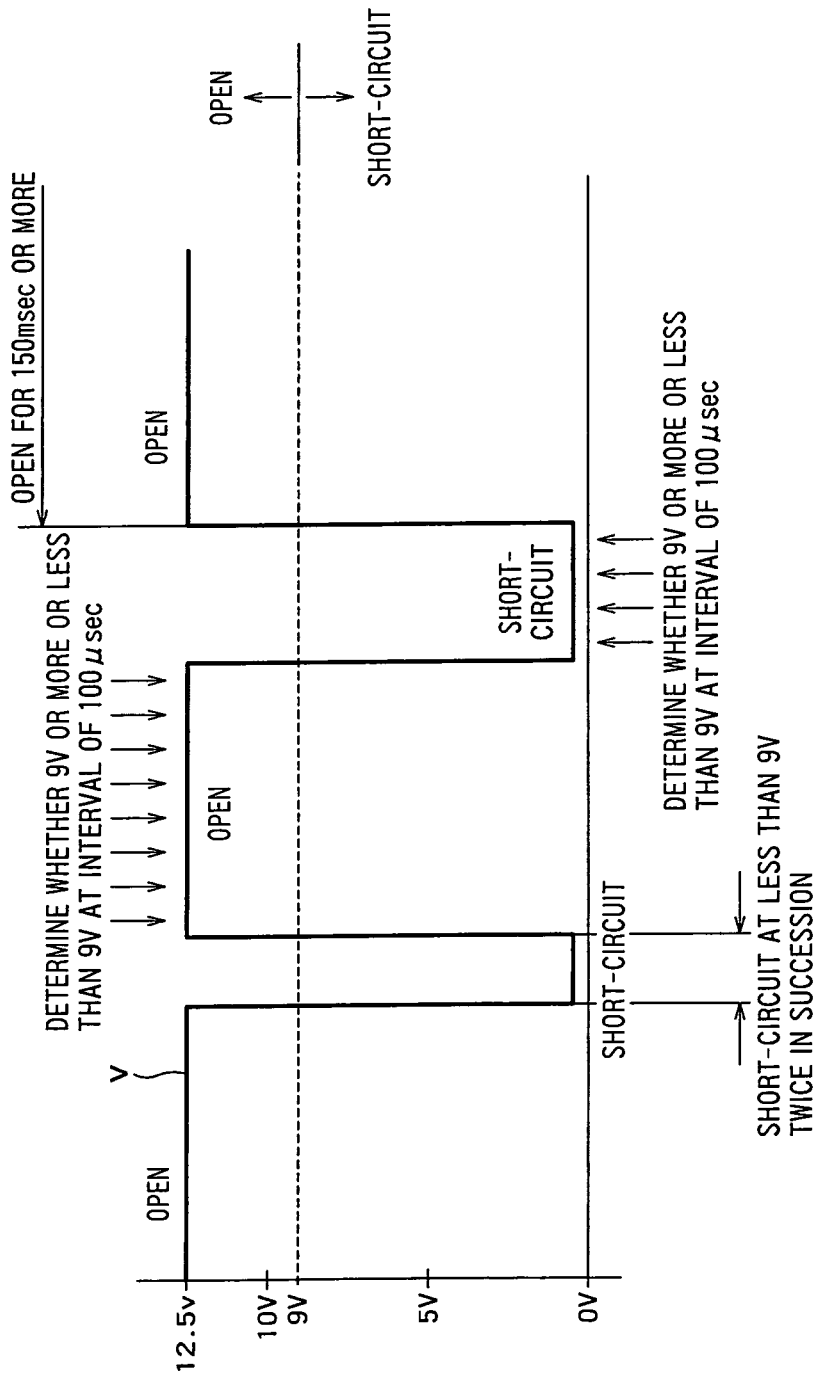
FIG. 2 is a timing chart showing a principle of formation of a restart signal in the embodiment in FIG. 1.

FIG. 2 is a voltage timing chart showing a detecting operation of the restart detecting circuit RS in FIG. 1. The detecting operation is to catch a predetermined change of a direct-current voltage "v" which is always applied between the output terminals + and −.

A direct-current voltage is applied to the output terminals + and − from the restart detecting power supply PS not only during the welding operation but also during the idle time of the engine E. Accordingly, unless the welding rod WH and the base material BM are short-circuited, the voltage between the output terminals + and − is applied to the restart detector RS via the welding voltage detector VS.

Reducing the voltage by short-circuiting the output terminals + and − by causing the welding rod WH to contact the base material BM is made a sign for restart, and the engine E is restarted by catching the sign. The sign is set in advance as the contact operation of causing the welding rod WH to contact the base material BM twice at a predetermined interval like "tap, tap", or the contact operation of causing the welding rod WH to contact the base material BM three times like "tap, tap, tap".

As a result, unexpected restart is not caused by an unintentional voltage change due to incomplete control of the welding holder, and the engine can be restarted only when the voltage change mode showing the start of the welding operation is reliably detected. The engine can be restarted by only the contact operation of the welding rod, and therefore, extremely favorable operability is provided.

"Open" in FIG. 2 shows the state in which the welding rod WH does not contact the base material BM, whereas "short-circuit" shows the state in which it contacts the base material BM. As for the voltage between the output terminals + and −, voltage of 12.5 V is applied when the terminals are open, and the voltage reduces close to 0 V in the short-circuit state.

The restart detecting circuit VS continuously monitors the voltage every 100 μs, for example, and once catching the short-circuit state, it monitors the time when the next short-circuit state occurs. "Short-circuit for restart" means the short-circuit, in which the state at less than 9 V successively occurs twice or more at the intervals of 100 μs, occurs once more at the interval of 150 ms or more.

Accordingly, the state where the voltage becomes less than 9 V successively twice or more due to noise or the like is not regarded as "short-circuit for restart". Specifically, when the duration of the first short-circuit is the length of 100 microseconds or more, the short-circuit state of the same length occurs once again with "open" for 150 ms or more occurring between the first short-circuit and the second short-circuit, and the "open" of 150 ms or more occurs again next, the state is regarded as "short-circuit for restart".

Thereby, the two short-circuit states and the two open states are completed in sequence, and the restart condition is established. If this condition is not established, the engine is not restarted. In this case, "open" means the state in which the state at 9 V or more continues for 150 ms or more. Accordingly, if short-circuit occurs twice or more at the time interval shorter than this, it is not considered that the restart condition is established.

Figure 3:
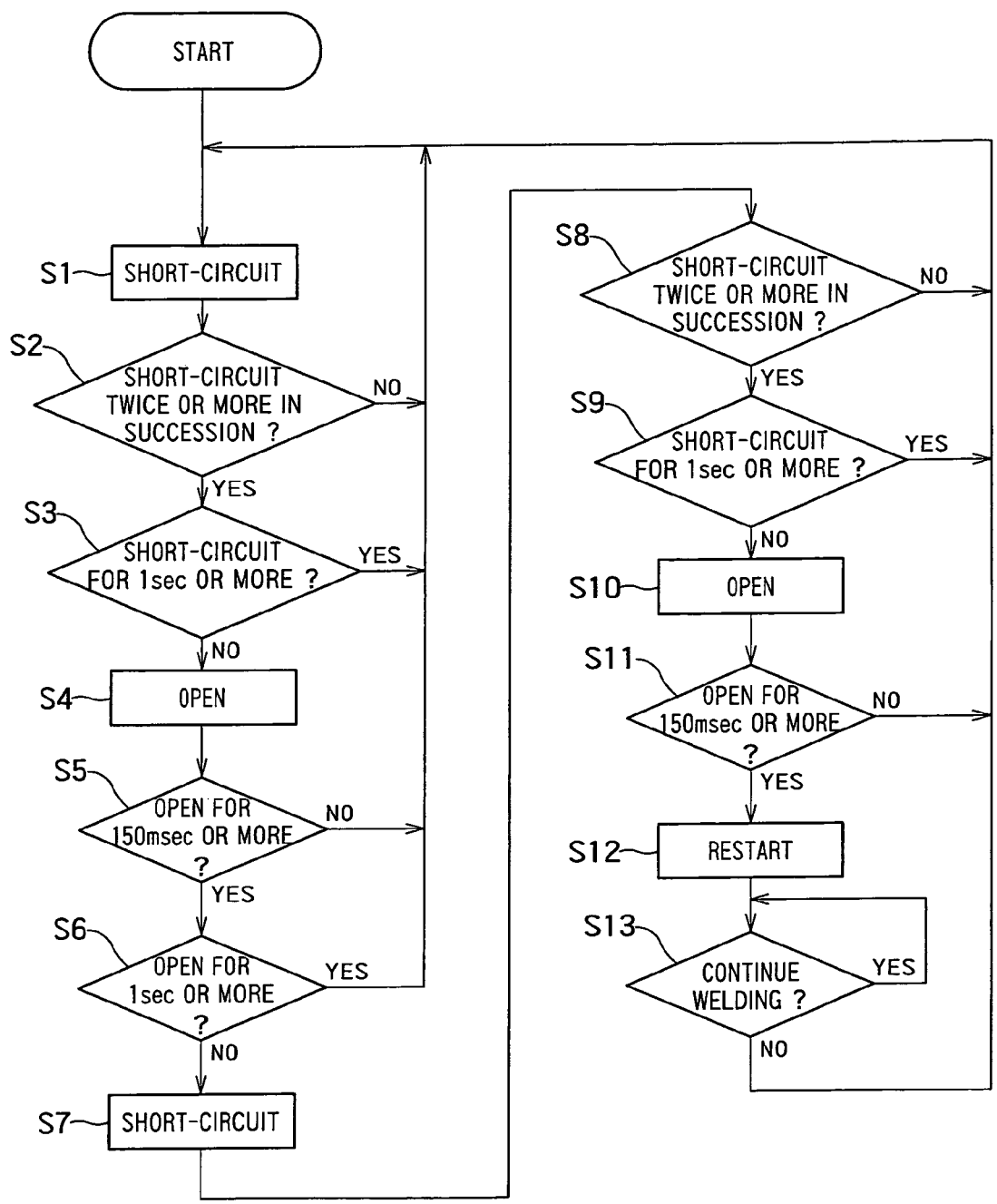
FIG. 3 is a flow chart for explaining an operation of the embodiment shown in FIG. 1.

FIG. 3 is a flowchart showing the detecting operation of the restart circuit RS in FIG. 1. It is assumed that while the engine stops, the welding rod WH contacts the base material BM, the voltage between the output terminals + and − reduces to less than 9 V, and this continues for 100 μs or more. This is "simply a short-circuit" state (step S1).

It is determined when the second "simply a short-circuit" state following this "simply a short-circuit" state occurs or whether it occurs or not (step S2), and if it occurs, the flow goes to step S3. If it does not occur twice in succession, or it does not occur at a predetermined time, the flow returns to step S1. In step S3, in order to determine whether the short-circuit state accidentally occurs or not, it is determined whether or not the duration is not less than one second. If it continues for one second or more, it is regarded as an accidental short-circuit state, and the flow returns to step S1.

If it is less than one second, the "open" state in step S4 is established. Therefore, the flow goes to step S5, and it is determined whether or not the duration of the open state is not less than 150 ms. After confirming that this is not an accidental open state, the flow goes to step S6. When the duration time is less than 150 ms, and it is regarded as an accidental open state, the flow returns to step S1.

Next, determination to eliminate the case where the open state is too long and is one second or more is made in step S6, and if it is less than one second, the flow goes through the second short-circuit in step S7, and it is determined whether or not two successive short-circuits for less than 100 μs, specifically, it is determined whether or not it is the short-circuit for restart by the operation of the operator in step S8.

Subsequently, it is determined whether or not the short-circuit continues for not less than one second as in step S3

(step S9). The flow goes through the open state in step S10 and goes to step S11, and it is determined whether or not the open time is not less than 150 ms.

Thereby, the voltage change corresponding to the two short-circuits for restart, that is, the operation of the operator of "tap, tap" is caught, and it is found that this is the situation for restart.

Thus, the restart by step S12 (described in detail based on FIG. 4) is performed. After the restart, the operation is continued as long as the welding operation continues (step S13), and after welding is finished, the welding machine is in the standby state until the next short-circuit occurs by step S1.

Figure 4:
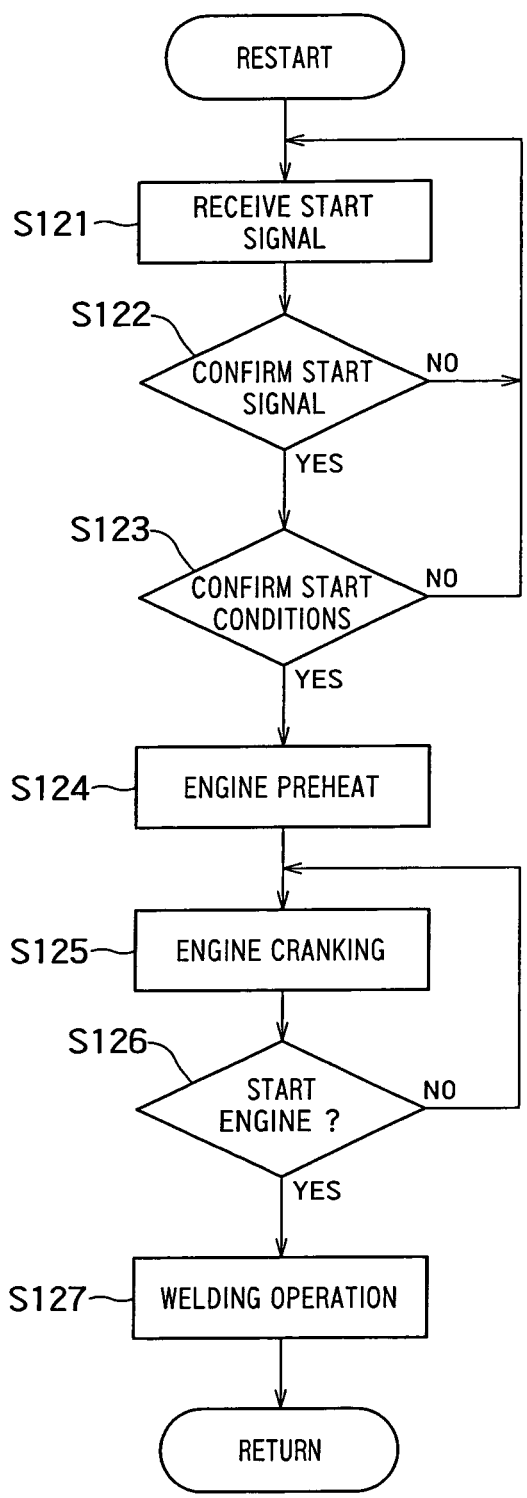
FIG. 4 is a flowchart showing an operation of restart in the flowchart shown in FIG. 3 in detail.

FIG. 4 is a flowchart showing the step S12 for restart in FIG. 3 in more detail. Specifically, when the signal for restart is given (step S121), it is confirmed that this is a starting signal (step S122). If it cannot be confirmed, the flow goes to step S121. If it can be confirmed, the flow goes to step S123, and the start conditions are confirmed. The start conditions are whether the circuit breaker for the alternating-current power supply is off, whether the side door is closed and the like.

After the start conditions are confirmed, the flow goes through the preheat of the engine (step S124), and engine cranking (step S125) is performed, and start by steps S125 and S126 is performed until the engine starts. When the engine starts, the welding operation (step S127) is performed, and the flow returns to the main flow shown in FIG. 3.

(Other Embodiments)

In the above described embodiment, as the sign set in advance, the predetermined change of the DC voltage is used, but this sign may be the change in current since any sign can be used as long as it can be electrically detected. If the signal which can be reliably discriminated from the noise and the accidental short-circuit is formed, various detecting forms can be selected with respect to the number of short-circuits, time and the like.

(Embodiment 2)

Figure 5:
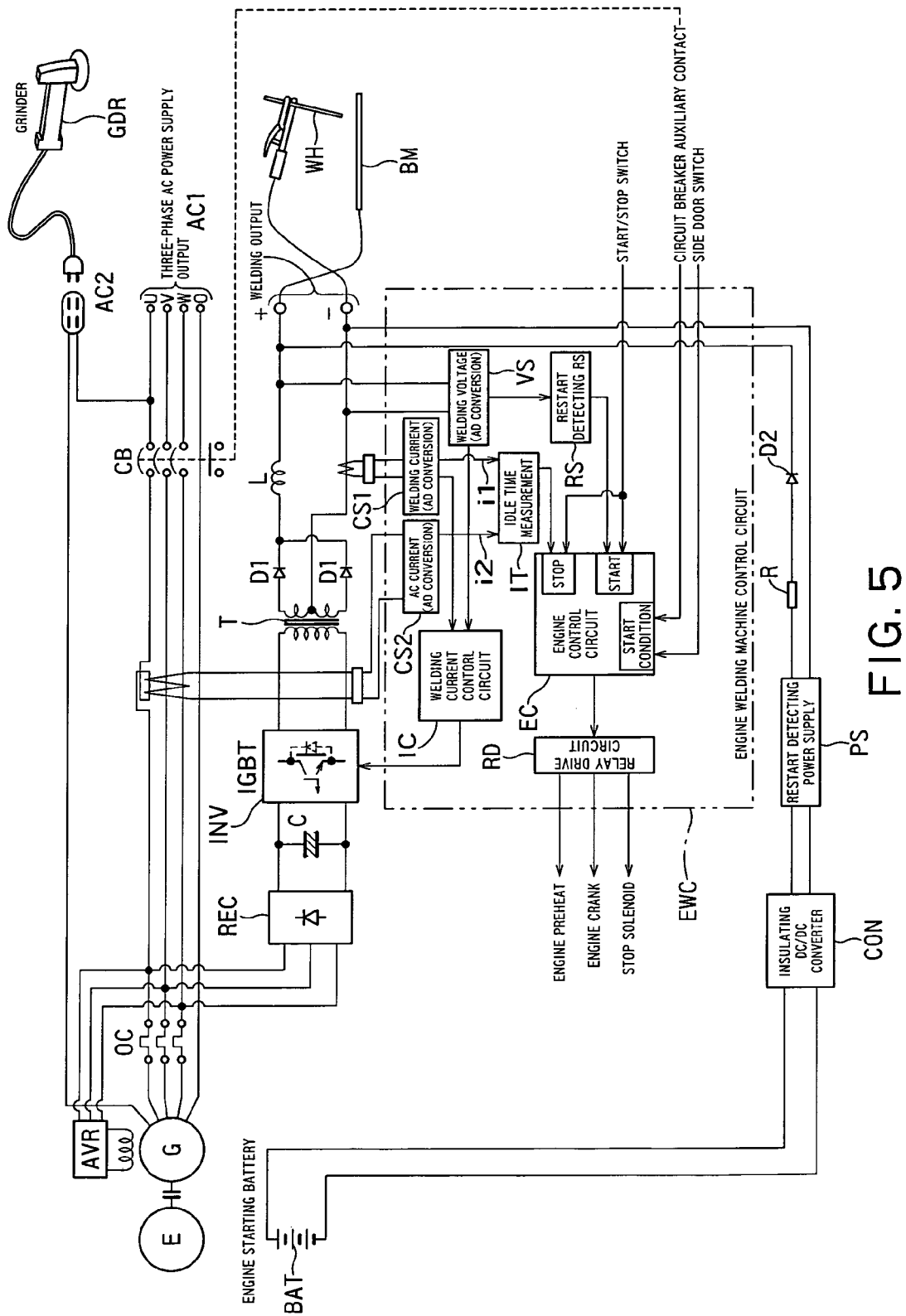
FIG. 5 is a circuit diagram showing the configuration of embodiment 2 of the present invention.

FIG. 5 is a block diagram showing the configuration of embodiment 2 of the present invention. The welding machine has a single-phase auxiliary receptacle AC2 which is mainly used for a grinder operation, in addition to the welding output terminals (+, −) and the three-phase alternating-current output terminals AC1 (U, V, W, O), so as to operate the engine in accordance with the load state of each of the terminals. The single-phase auxiliary receptacle AC2 is supplied with single-phase output which is taken out from a three-phase alternating-current output line.

Figure 6:
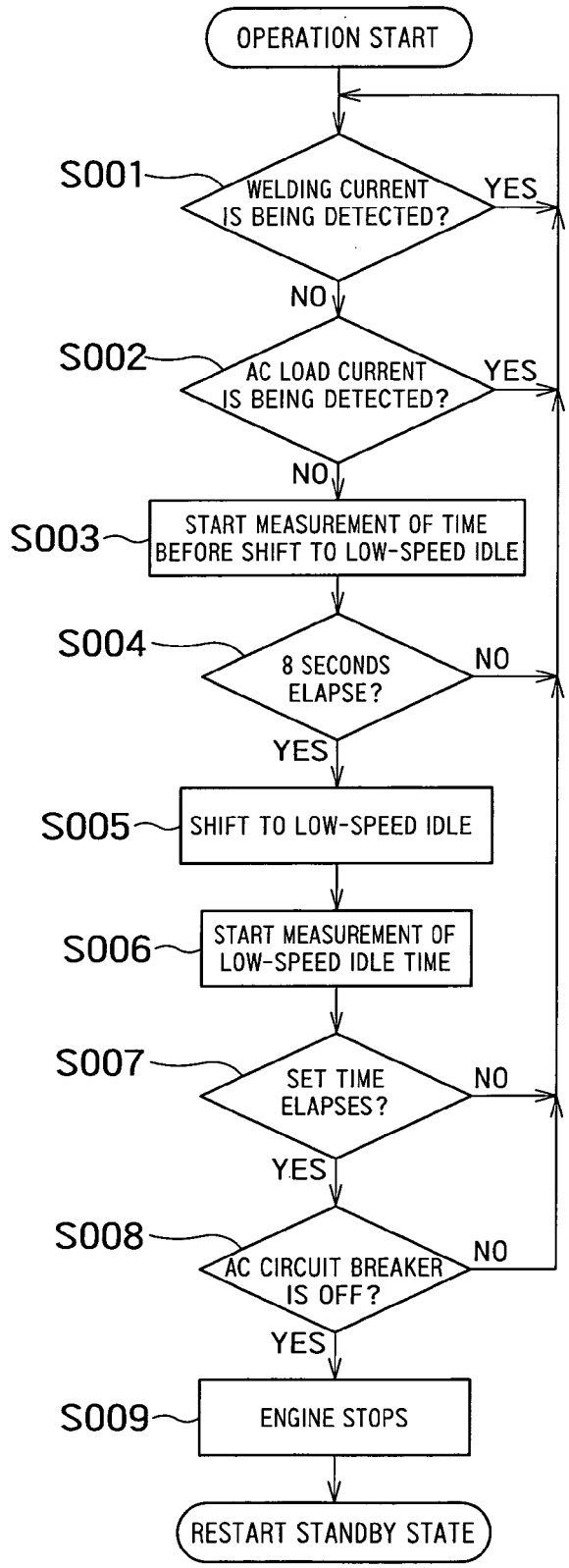
FIG. 6 is a flowchart showing an operation of embodiment 2 shown in FIG. 5.

FIG. 6 is a flowchart showing an operational action of embodiment 2 shown in FIG. 5. The welding machine in a normal operating state is shifted to a low-speed idle operation state or stopped by performing operation control of the engine in accordance with the load state (welding load, alternating current load) and the like.

If the engine driven welding machine is under operation now, the presence or absence of the welding current is detected during this time (step S001), then, the presence or absence of an alternating-current load current is detected (step S002), and the time in which neither of the currents are present is measured (step S003). After waiting until, for example, eight seconds elapses (step S004), the engine is sifted to a low-speed idle operation (step S005). If the load is applied during the low-speed idle operation, the engine is shifted to a normal operation.

Meanwhile, when the state in which no load is applied continues for a previously set time (steps S006 and S007), on the condition that the circuit breaker placed in the alternating-current load circuit is off (step S008), the engine is stopped (step S009) to be in a restart standby state.

In this manner, the operation in which the operation state of the engine is changed in accordance with the respective states of the welding load and alternating-current load of the engine driven welding machine is performed.

(Embodiment 3)

Figure 7:
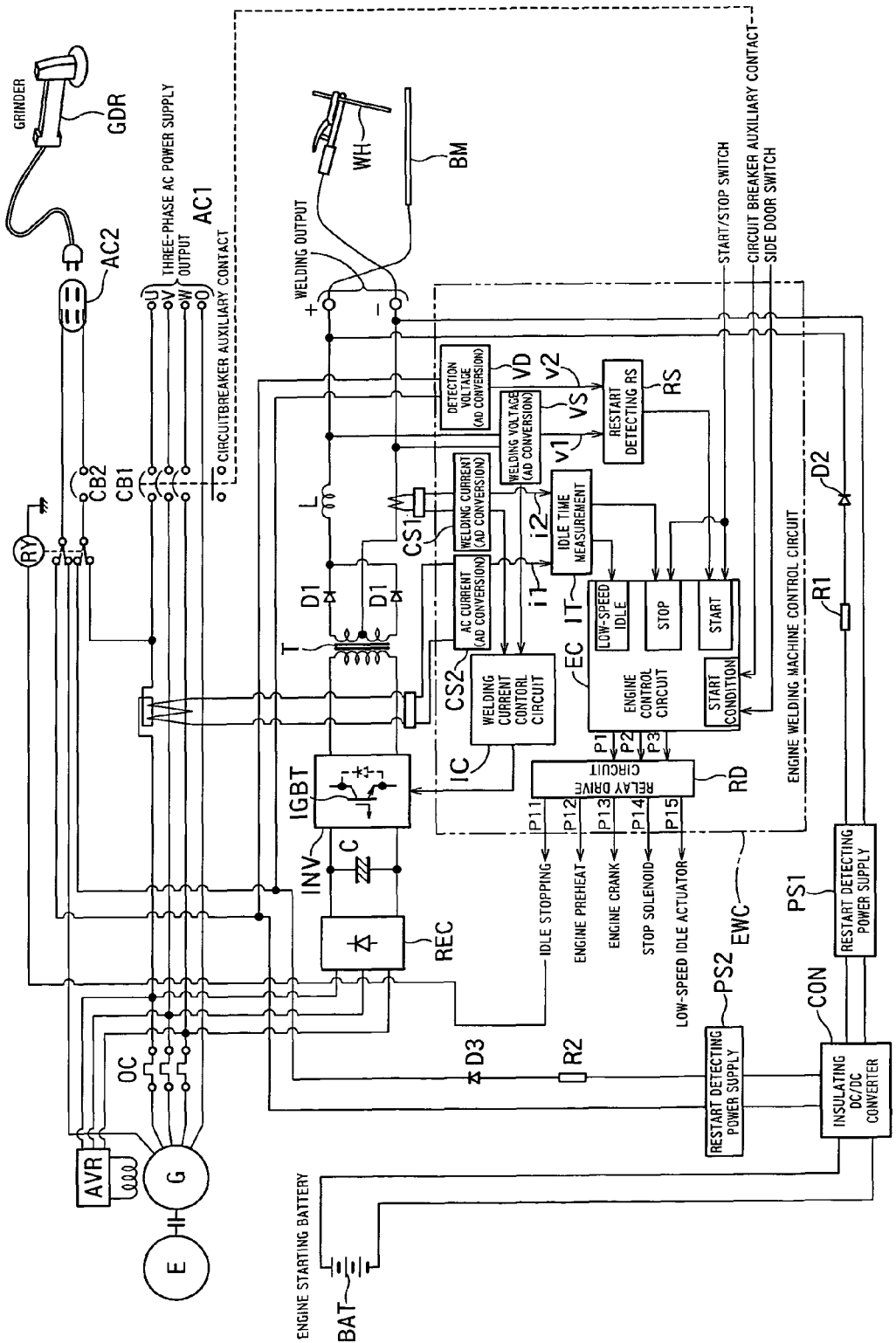
FIG. 7 is a circuit diagram showing the configuration of embodiment 3 of the present invention.

FIG. 7 is a block diagram showing a configuration of embodiment 3 of the present invention. Embodiment 3 differs from the configuration of embodiment 1 shown in FIG. 1 in the point that an engine driven welding machine under description is provided with the single-phase auxiliary receptacle AC2 which uses part of the output of the three-phase alternating-current output terminal AC1 as in embodiment 2.

Further, the different point from embodiment 2 is that not only a restart signal can be formed by short-circuiting/opening of the welding output terminals, but also a restart signal can be formed by turning on and off the switch of a grinder which is connected to the single-phase auxiliary receptacle AC2. For this purpose, an engine welding machine control circuit EWC is configured to include a voltage detector VD which detects the voltage of the single-auxiliary receptacle AC2 and to give the detection output to the restart detecting circuit RS.

Accompanying this, in order to detect the time when power needs to be supplied to a load GDR from the single-phase auxiliary receptacle AC2, a circuit including a restart detecting power supply PS2, a resistor R2 and a diode D3 which is placed in a route for supplying power to the single-auxiliary receptacle AC2 from the restart detecting power supply PS2, and a switch RY which switches to single-phase alternating-current output or the restart detecting power supply PS2 and connects it to the single-phase auxiliary receptacle AC2.

Since the single-phase auxiliary receptacle AC2 is supplied with power by using part of the output of the three-phase alternating-current output terminal AC1, the power supply state of the three-phase alternating-current output terminal AC1 also needs to be detected to operate the engine driven welding machine as the single-phase auxiliary receptacle AC2, and a current detector CS2 which detects a current of the three-phase alternating-current output line is provided. The current detector CS2 is not shown in FIG. 1, but it is such a current detector as an ordinary engine driven welding machine includes.

Here, though the single-phase auxiliary receptacle AC2 uses part of the three-phase alternating-current output power, a circuit breaker CB2 is separately provided so that the output power does not pass through the circuit breaker CB1, and only a current sensor and an over current relay OC are shared with the three-phase alternating-current output. Stop of idling and engine restart are both based on the condition that the circuit breaker CB1 is turned off, and therefore, if the circuit breaker CB1 is shared with the three-phase alternating-current output power, the single-phase auxiliary power supply cannot be directly used. Therefore, the circuit breaker CB2 is additionally provided for the single-phase auxiliary receptacle.

As a result, when the engine driven welding machine does not use any of welding output, three-phase alternating-current output or single-phase auxiliary output, it stops the engine after going through a low-seed idling operation from a high-speed idling operation, and when it receives a restart signal from the welding output terminal or the single-phase auxiliary receptacle, it restarts the engine.

As described above, the single-phase auxiliary receptacle AC2 is included, and the engine is controlled in accordance with the result of detecting the load state of the single-phase auxiliary receptacle AC2. Therefore, the operation accompanying welding, such as a finishing operation and the like using the grinder GDR, for example, can be smoothly performed.

Figure 8:
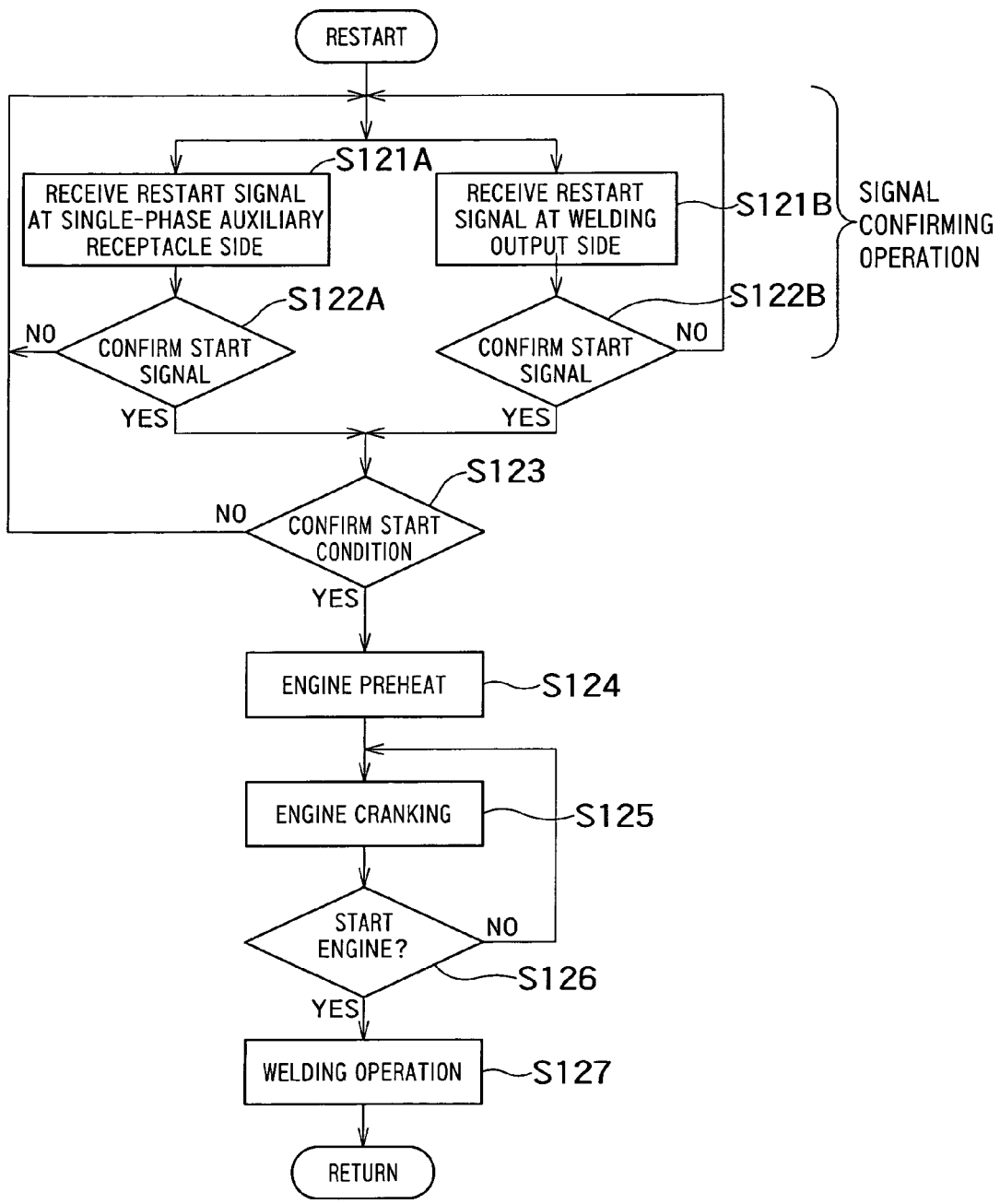
FIG. 8 is a flowchart showing an operation of embodiment 3 of the present invention.

FIG. 8 is a flowchart showing an operation of embodiment 3, which corresponds to FIG. 4 showing the operation of embodiment 1. In this flowchart, steps S121 and S122 in FIG. 4 are divided into steps S121A and S121B, and S122A and S122B, and the flowchart shows that the engine driven welding machine is restarted by the start signal of the single-phase auxiliary receptacle side as well as the start signal of the welding output side. In accordance with necessity, a detecting power supply is also provided at the three-phase alternating-current output side, and the engine driven welding machine may be similarly restarted by the start signal of it.

Figure 9:
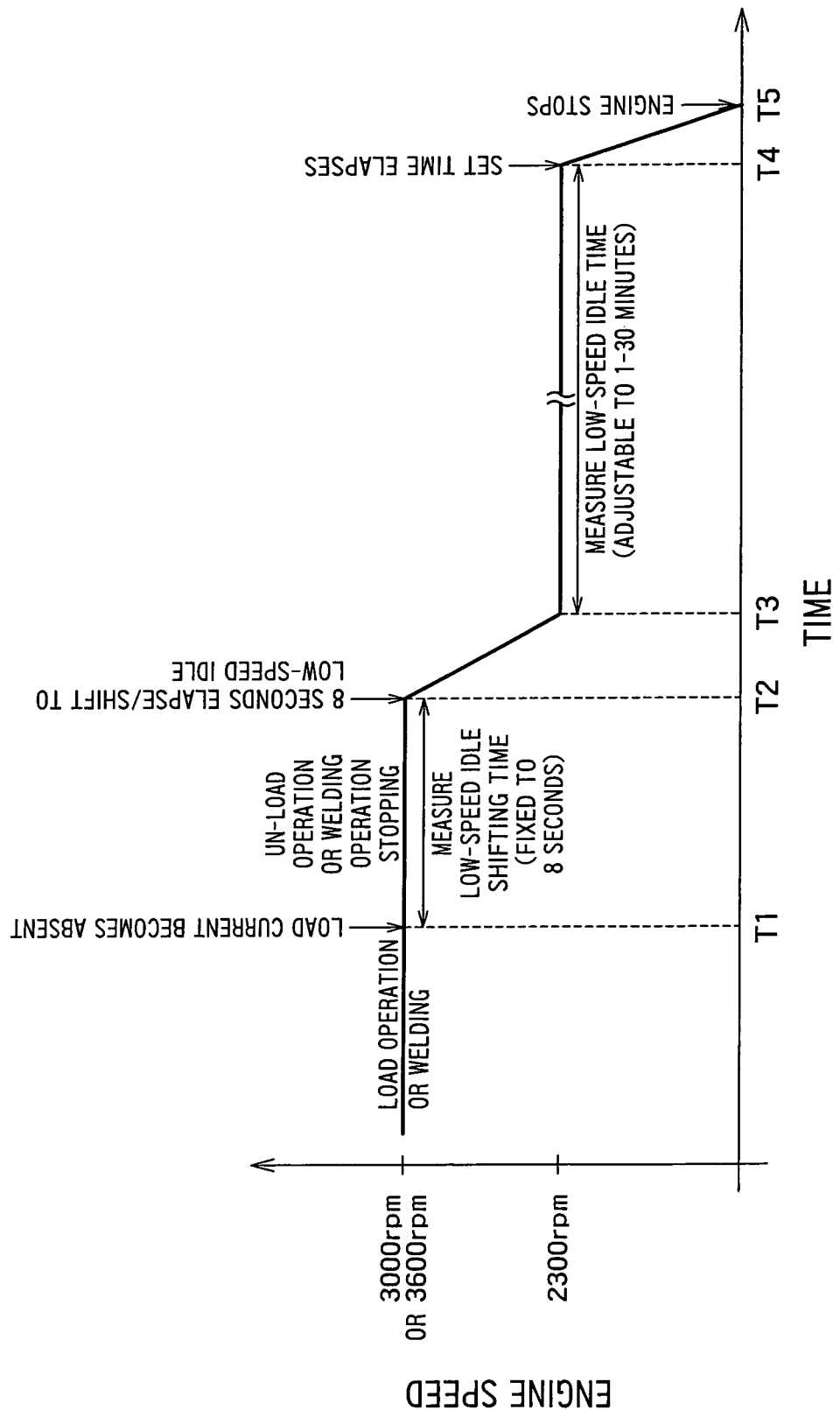
FIG. 9 is a time chart showing a change in the engine speed from the time in which the engine is operating to the time of stop of the engine in the operation shown in FIG. 8.

FIG. 9 shows the transition of the engine speed in the process until the engine driven welding machine under operation stops. The engine driven welding machine, which operates with a welding load and a (three-phase or single-phase) alternating-current load until a time T1, shifts to a high-speed idle operation state when it is brought into a no-load state. At this time, the engine speed is a high speed (3,000 rpm or 3,600 rpm) which is the same as that at the operating time, and the engine starts to decelerate at a time T2 after, for example, eight seconds elapse, and is in a low-speed idle operation state (about 2,300 rpm) at a time T3.

The no-load state still continues, and a predetermined time, for example, one to about 30 minutes elapses before a time T4 comes. At the time T4, the engine further decelerates. At a time T5, the engine is in an engine stop state, is in a so-called standby state.

Figure 10:
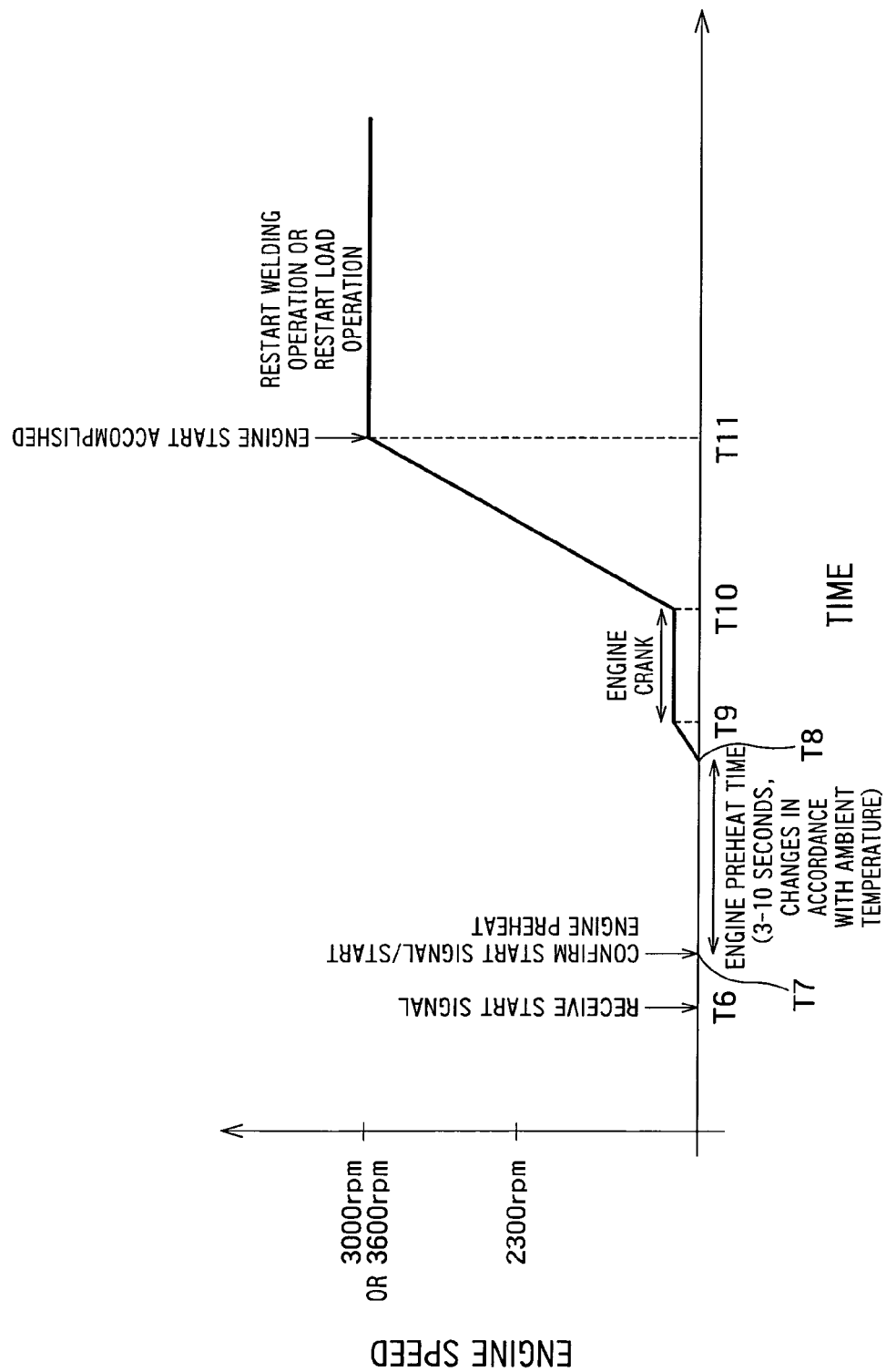
FIG. 10 is a time chart showing a change in the engine speed when the engine starts in the same operation.

FIG. 10 shows the transition of the engine speed in the process until the engine driven welding machine which is in the above standby state restarts an operation.

When a start signal is input at a time T6, preheat of the engine is started at a time T7 after it is confirmed that the start signal is still present. Subsequently, about three to ten seconds, which is the engine preheat period, elapse before a time T8, and after the start signal is given up to a time T9, engine is cranked. At a time T10, the engine speed starts to increase. Subsequently, at a time T11, the engine speed reaches a predetermined engine speed (3,000 or 3,600 rpm).

Figure 11:
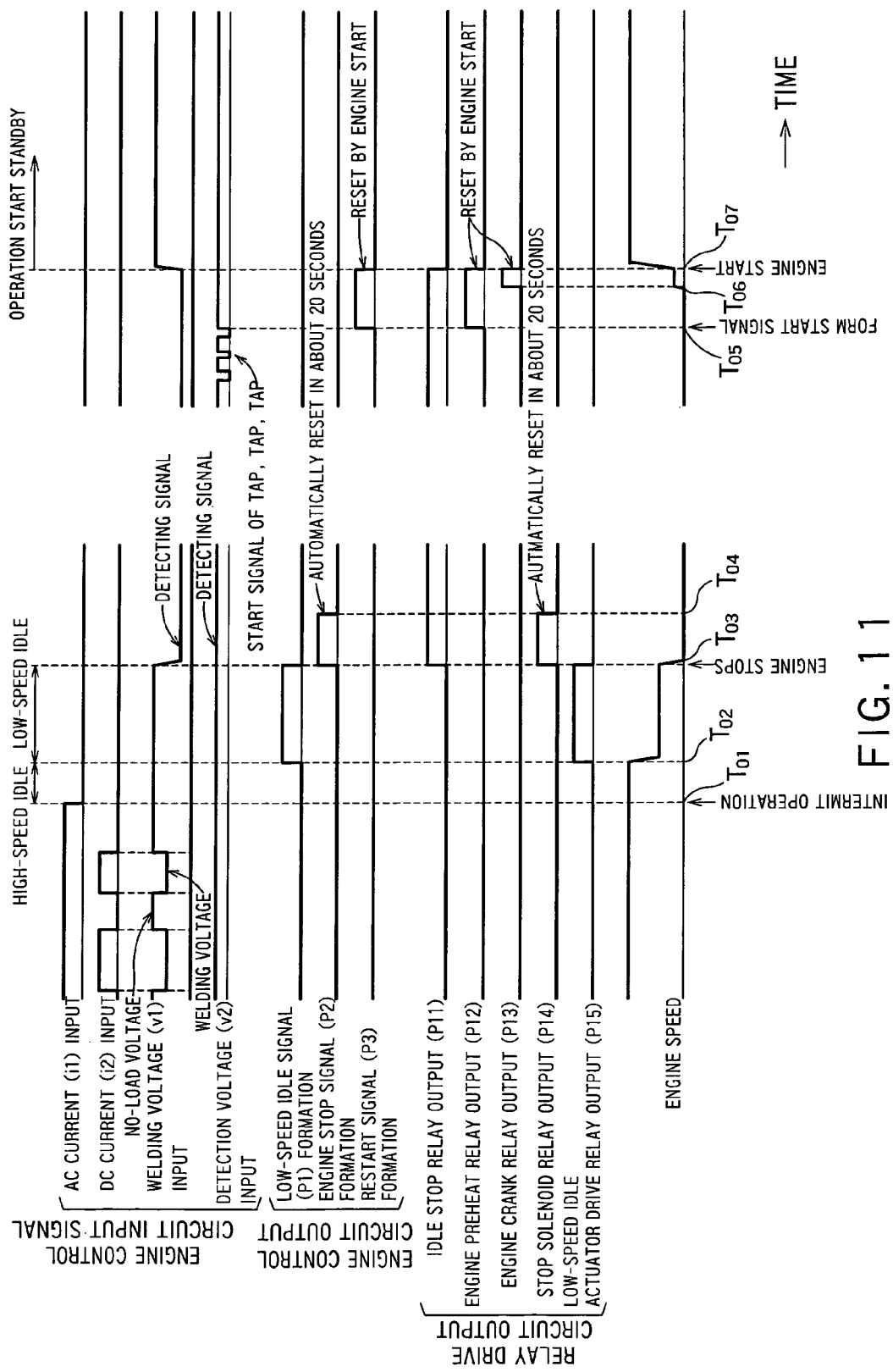
FIG. 11 is a time chart showing a signal of each part of the circuit in embodiment 3 of FIG. 8.

FIG. 11 is a time chart showing a signal of each part in the operation of embodiment 3 shown in FIG. 7. By using the time chart and block diagram (FIG. 7), the operation of each of the parts of embodiment 3 will be described.

Embodiment 3 is formed by adding the single-phase auxiliary receptacle and its related circuit to the configuration of embodiment 1. Therefore, its operation content has the operation of embodiment 1 as the basic operation content, and has operation content added to it. The respective operations are performed as the operations of the engine control circuit EC and the relay drive circuit RD in the engine driven welding machine control circuit EWC.

The engine control circuit EC forms a low-speed idle signal p1, an engine stop signal p2 and a restart signal p3 and outputs them, in accordance with four input signals, that is, an alternating current (three-phase alternating-current output and a single-phase auxiliary output) i1, a direct current (welding output) i2, and a welding voltage v1 and a detection voltage v2.

The relay drive circuit RD outputs five relay drive signals, that is, an idle stopping signal P11, an engine preheat signal P12, an engine crank signal P13, a stop solenoid signal P14 and a low-speed idle actuator signal P15 in accordance with the output signals p1, p2 and p3 of the engine control circuit.

Following the timing chart of FIG. 11, first, the alternating current i1 is output, and the direct current i2 which is welding output is intermittently supplied. In correspondence with this, the welding voltage v1 repeats change to and from the no-load voltage and the welding voltage.

When this situation finishes at a time T01, the alternating current i1 becomes zero, and the engine driven welding machine shifts to a high-speed idle operation state. The high-speed idle operation state means the state in which the engine is under no-load, but the engine speed is a high speed (3,000 rpm or 3,600 rpm).

The high-speed idle time is ordinarily set to eight seconds, and at a time T02, the engine control circuit EC forms the low-speed idle signal P1 and gives it to the relay drive circuit RD. The relay drive circuit RD gives a signal P15 to a low-speed idle actuator to reduce the engine speed to a predetermined speed (about 2,300 rpm). The duration of the low-speed idle signal P1 is set to one minute to about 30 minutes, and after this time elapses, a time T03 comes. When the low-speed idle signal P1 terminates at the time T03, the relay drive circuit RD stops output of the signal P15 to the low-speed idle actuator drive relay.

When the low-speed idle signal P1 terminates at the time T03, the engine control circuit EC forms the engine stop signal P2 and gives it to the relay drive circuit RD. The relay drive circuit RD generates the idle stop relay output P11 and the stop solenoid relay output P14 to stop the engine. After the lapse of time of about 20 seconds after the engine stops (time T04), the engine control circuit EC resets the engine stop signal P2, and gives it to the relay drive circuit RD, and therefore, the relay drive circuit RD cancels the stop solenoid relay output P14.

As a result, the engine driven welding machine does not generate welding output or alternating-current output. In such a situation, for example, a grinder operation is sometimes performed. At this time, in order to detect that the grinder GDR connected to the single-phase auxiliary receptacle AC2 is turned on, a detecting voltage is supplied to the single-phase auxiliary receptacle AC2 from the restart detecting power supply PS2.

Specifically, the idle stop relay RY is biased by the low-speed idle stop relay output P11 from the relay drive circuit RD to connect the contact, which is inserted into the power supply circuit to the single-phase auxiliary receptacle AC2, to the restart detecting power supply PS2. Therefore, a detecting voltage (direct current) is applied to the single-phase auxiliary receptacle AC2 while the engine driven welding machine stops, and the voltage detector VD detects switching-on of the grinder GDR.

When the switch of the grinder GDR is turned on and off like "click, click" or "click, click, click", the voltage detector VD detects reduction in the detecting voltage by this to form the same signal as that of the welding voltage detector VS, that is, the same signal as that formed when the welding rod WH is caused to contact the base material BM like "tap, tap" or "tap, tap, tap", and gives the output to the restart detecting circuit RS.

In response to this, at a time T05, the restart detecting circuit RS gives a start signal to the engine control circuit EC, and the restart signal P3 is output to the relay drive circuit RD from the engine control circuit EC. The relay drive circuit RD generates the engine preheat relay output P12 in response to the restart signal P3, and generates the engine crank relay output P13 at a time T06 which is a little later to restart the engine E.

As a result, when the engine E is restarted at a time T07, the speed of the engine E increases, so that welding output and alternating-current output can be supplied from the engine driven welding machine. At the time T07, the idle stop relay output P11 terminates, and an alternating-current voltage is supplied to the single-phase auxiliary receptacle AC2 instead of the detecting voltage (direct current).

As above, in the engine driven welding machine, a high-speed operation (with load), a high-speed idle operation, a low-speed idle operation and stop of the engine E are performed in accordance with the presence and absence of the welding load, and three-phase and single-phase alternating-current loads.

Here, the restart signal which turns on and off the switch of the grinder GDR like "click, click" or the like is recognized as the restart signal when the restart signal terminates with the last signal turning off the switch. Specifically, if the engine starts to rotate when the switch of the grinder GDR is on, there is the risk of the grinder GDR suddenly starting to rotate, and it is also dangerous if the switch of the grinder GDR is turned on during engine start. Therefore, the engine start is stopped.

This similarly applies to the restart signal of the welding terminal side. The signal for "tap, tap" or the like always has to terminate with the last signal for "open" as in FIG. 2 for safety, and when short-circuit occurs during engine start, the engine start is also stopped for safety.

Further, even when the restart signal of one of them is formed, if the other one remains to be short-circuited, or the switch is still on, the restart signal is cancelled for safety.

What is claimed is:

1. An engine driven welding machine in which a welding generator is driven by an engine, and said engine performs an idle operation when a welding operation is stopped, comprising:
    an engine stop signal forming circuit which forms a stop signal for stopping an operation of said engine when time of said idle operation exceeds a predetermined time;
    a direct-current power supply independent and isolated from a battery or other power supplies, connected to an output terminal of said welding machine;
    voltage detecting means which detects a voltage change of said output terminal;
    a restart detecting circuit which forms a restart signal for restarting said engine when the detected voltage by said voltage detecting means shows a predetermined change mode for starting the welding operation; and
    an engine control circuit which stops said engine in response to said stop signal, and restarts said engine in response to said restart signal;
    wherein said direct-current power supply forms predetermined voltage output;
    wherein said restart detecting circuit forms said restart signal when said detected voltage shows the change mode corresponding to repetition of short-circuit and opening of said output terminals a predetermined number of times by contacting the welding rod with the base material;
    wherein said restart detecting circuit forms said restart signal when durations of short-circuit and opening of said output terminals and intervals of both of them are in predetermined ranges, and recognizes said predetermined change mode when the restart signal terminates with the last signal turning off the switch.

2. The engine driven welding machine according to claim 1, further comprising a circuit breaker having an auxiliary contact and an alternating-current output terminal for supplying an alternating-current power supply,
    wherein when said circuit breaker is closed and said casing is opened, said restart signal is not formed.

3. The engine driven welding machine according to claim 1,
    wherein said engine driven welding machine comprises
    a single-phase auxiliary receptacle which outputs part of alternating-current output,
    a detecting power supply for supplying a detecting voltage to said single-phase auxiliary receptacle, and
    a switch which switches and connects the single-phase auxiliary receptacle to an alternating-current output line when the engine is operating, and to said detecting power supply of said welding machine when the engine is not operating,
    wherein said restart detecting circuit is configured to detect a voltage of said single-phase auxiliary receptacle, and
    said welding generator restarts in accordance with a detection signal of said restart detecting circuit, the detection signal being formed by repetition of turning on and off of the power supply of an electric tool connected to a single-phase auxiliary receptacle.

4. The engine driven welding machine according to claim 3, further comprising a three-phase alternating-current output terminal separately from said single-phase auxiliary receptacle,
    wherein when said engine driven welding machine does not generate welding output, and neither said single-phase auxiliary receptacle nor said three-phase alternating-current output terminal supplies alternating current power, said engine driven welding machine is stopped.

* * * * *